May 21, 1935. W. G. H. FINCH Re. 19,575
IMAGE BROADCASTING SYSTEM
Original Filed March 26, 1934 10 Sheets-Sheet 1
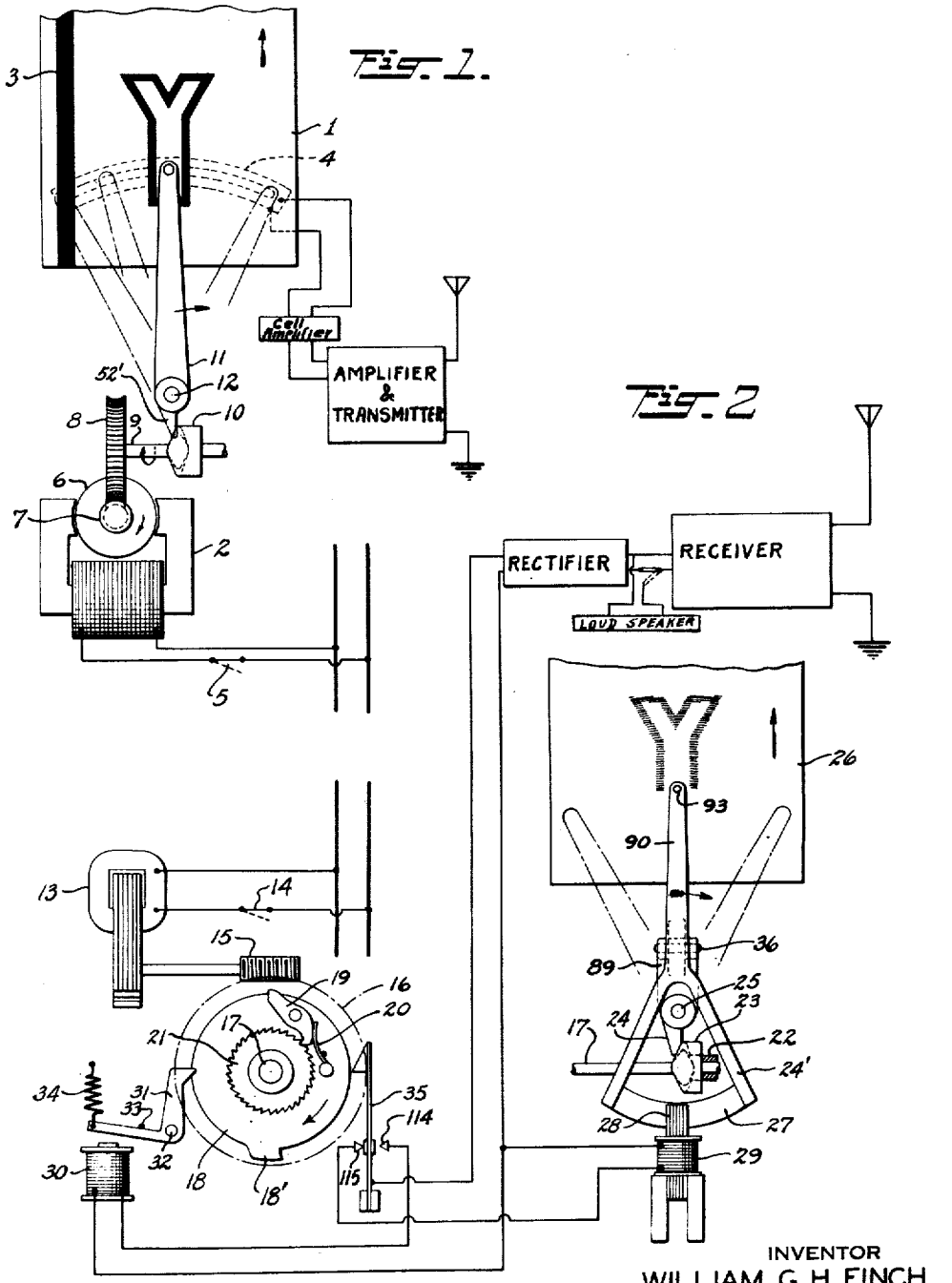
INVENTOR
WILLIAM G. H. FINCH.
BY Samuel Petrokubi
ATTORNEY May 21, 1935. W. G. H. FINCH Re. 19,575
IMAGE BROADCASTING SYSTEM
Original Filed March 26, 1934 10 Sheets-Sheet 2
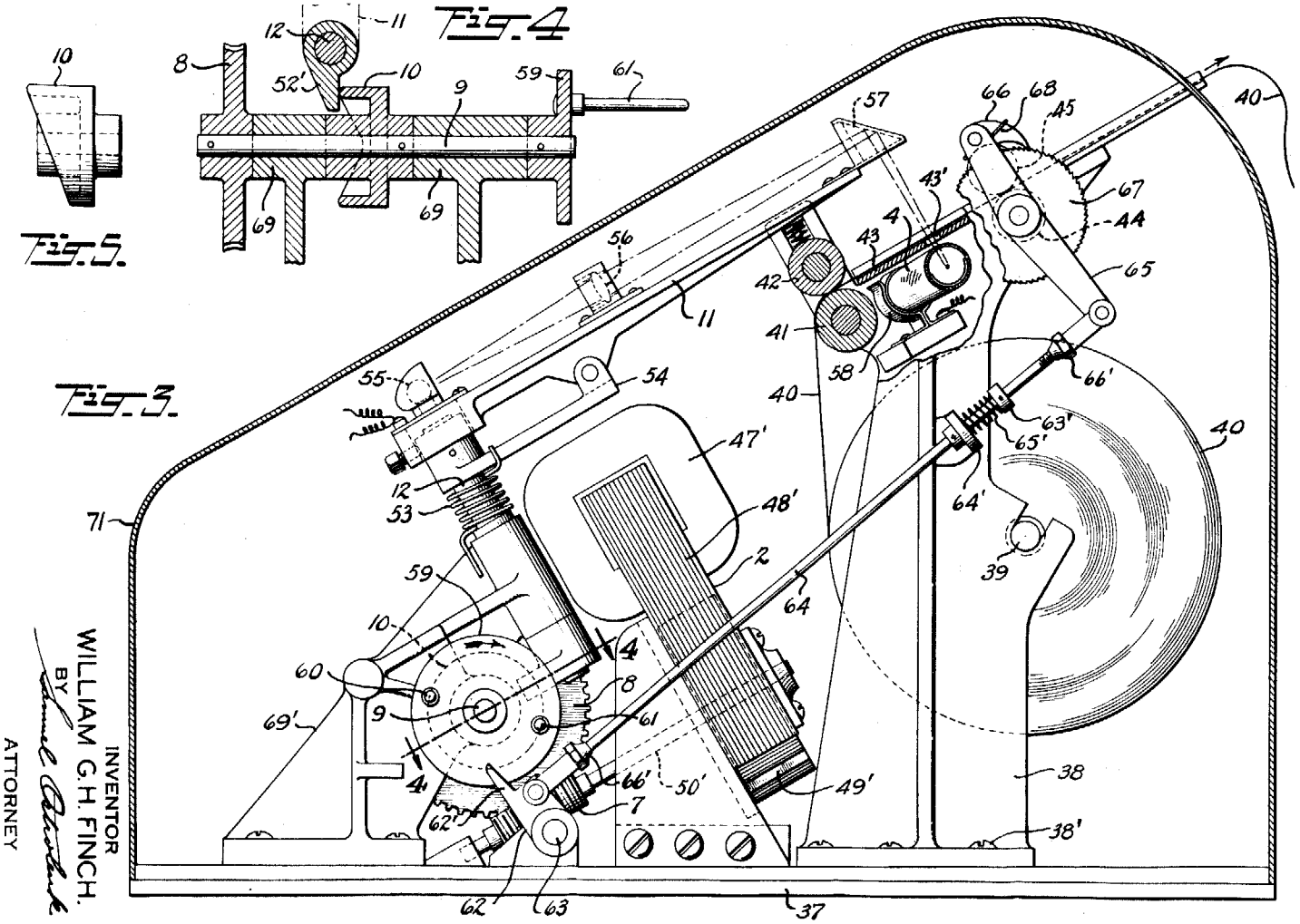
INVENTOR
WILLIAM G. H. FINCH.
BY Samuel Ostrolenk
ATTORNEY

IMAGE BROADCASTING SYSTEM

Original Filed March 26, 1934 10 Sheets-Sheet 3

INVENTOR
WILLIAM G.H. FINCH.
BY Samuel Ostrolenk
ATTORNEY

IMAGE BROADCASTING SYSTEM

Original Filed March 26, 1934 10 Sheets-Sheet 4

INVENTOR
WILLIAM G. H. FINCH.
BY Samuel Ostrolenk
ATTORNEY

May 21, 1935. W. G. H. FINCH Re. 19,575

IMAGE BROADCASTING SYSTEM

Original Filed March 26, 1934 10 Sheets-Sheet 5

INVENTOR
WILLIAM G. H. FINCH.
BY Samuel Ostrolenk
ATTORNEY

May 21, 1935. W. G. H. FINCH Re. 19,575

IMAGE BROADCASTING SYSTEM

Original Filed March 26, 1934 10 Sheets-Sheet 6

INVENTOR
WILLIAM G. H. FINCH.
BY Samuel Ostrolenk
ATTORNEY

IMAGE BROADCASTING SYSTEM

Original Filed March 26, 1934 10 Sheets-Sheet 7

INVENTOR
WILLIAM G. H. FINCH.
BY Samuel Ostrolenk
ATTORNEY

IMAGE BROADCASTING SYSTEM

Original Filed March 26, 1934 10 Sheets-Sheet 8

INVENTOR
WILLIAM G. H. FINCH.
BY Samuel Ostrolenk
ATTORNEY

IMAGE BROADCASTING SYSTEM

Original Filed March 26, 1934 10 Sheets-Sheet 9

INVENTOR
WILLIAM G. H. FINCH.
BY Samuel Ostrolenk
ATTORNEY

IMAGE BROADCASTING SYSTEM

Original Filed March 26, 1934 10 Sheets-Sheet 10

INVENTOR
WILLIAM G. H. FINCH.
BY Samuel Ostrolenk
ATTORNEY

Reissued May 21, 1935 Re. 19,575

UNITED STATES PATENT OFFICE 19,575

IMAGE BROADCASTING SYSTEM

William G. H. Finch, Washington, D. C.

Original No. 1,985,654, dated December 25, 1934, Serial No. 717,304, March 26, 1934. Application for reissue March 23, 1935, Serial No. 12,704

47 Claims. (Cl. 178—5)

My invention relates to novel apparatus for and methods of transmitting signals and more particularly relates to novel apparatus for and methods of visual broadcasting.

In the transmission of facsimile signals it has heretofore been the practice to employ a cylindrical member on which the picture or object to be transmitted by facsimile was mounted. The cylinder was scanned by rotating the cylinder past a pointer and at the same time moving the cylinder with respect to the pointer in a longitudinal direction by means of a worm mounting. An electrical contactor mounted on a stylus was employed for detecting the light variations of the image on the cylinder.

The obvious defect of such a system was that it could transmit only the image mounted on the cylinder and was not adapted for the continuous transmission of messages.

For the purpose of transmitting any relatively long messages by facsimile, it has been proposed to oscillate an arm carrying a stylus over a moving sheet on which the message which is to be transmitted by facsimile is recorded. In this type of arrangement no practical photoelectric cell arrangement which is operated in accordance with variations of the image for transmitting facsimile signals has heretofore been developed, nor has it been possible in the systems heretofore used to employ the same system and apparatus for the transmission either of black and white pictures or half tones, as desired.

Moreover, the mechanisms proposed were complicated, requiring many parts which were heavy and no practical construction has been suggested for facsimile transmission which would be adaptable for mobile use, as on automobiles, airplanes, ships and the like.

I have invented a novel adaptation of the photoelectric cell arrangement and simple synchronizing arrangement, requiring a mechanism light in weight, inexpensive and easy to operate for the broadcasting of images, the apparatus being operated either by wire or by radio.

A need has especially arisen for a mobile image broadcast receiver mounted on devices such as automobiles, buses, airplanes, sea vessels, etc. Heretofore it has been the practice to receive messages on such devices by telephone. This had the defect of being costly, leaving no record of the receipt of such message, and involving the human error in reception.

To overcome these defects, I have invented a mobile printer which makes a permanent record of the message received, is inexpensive and sufficiently light to be practical for mobile purposes. This forms the subject matter of my Patent 1,932,579, granted October 31, 1933 and my copending application S. N. 695,740 filed October 31, 1933.

As a complement to the printer described in the patent and application referred to above, a receiver for the reception of broadcast images is also required. Heretofore, it has been found necessary to provide heavy, complicated and costly equipment for such reception. This retarded its more general use and made its use for mobile purposes practically out of question.

I have developed a receiver of broadcast images which is primarily inexpensive and light, so that it can be used as a mobile device for reception.

Accordingly, an object of my invention is to provide novel apparatus for and methods of transmitting pictures.

A further object of my invention is to provide novel methods of and apparatus for transmitting either black or white pictures, as desired.

Still a further object of my invention is to provide novel apparatus for and methods of synchronizing an image broadcasting system.

Another object of my invention is to provide a novel image broadcasting system which may be operated either by radio or by wire circuits.

Still a further object of my invention is to provide a novel construction of photoelectric cell.

Another object is to provide novel image broadcasting system operated by photoelectric cell.

Still a further object is to provide a novel mobile image broadcasting system adapted for use in automobiles, airplanes, ships and the like.

Still another object is to provide a simple, rugged image broadcasting receiver that may be operated directly from a radio receiver.

A further object is to provide novel synchronizing means whereby the same signal channel is employed for the image and the synchronizing signals.

In the operation of facsimile systems heretofore, the rate at which words could be sent was so much lower than the rate of transmitting by telegraphy that the use of facsimile for such purposes has been impractical.

I have discovered that detail is not consequential in image transmission of words and that by a sacrifice of detail I can provide a word transmitting system operating at even higher speeds than now obtainable by telegraphy.

In accordance with my invention, I contemplate reducing the image to be transmitted a number of times to an image which is a small fraction in size of the original image; scanning this reduced image for transmission; receiving the image reduced; and thereafter enlarging it. In a modified form I contemplate operating the receiver scanner to produce a direct enlargement.

Accordingly a further object of my invention is to provide novel apparatus for and methods of broadcasting word images.

A further object of my invention is to provide novel apparatus for and methods of broadcasting images by reducing the sizes of the image to be broadcasted; receiving the reduced image; and enlarging it.

In one application of my system I contemplate employing the standard radio receiver now found in most homes, for the reception of broadcast images.

Heretofore it has been impossible to transmit messages for recording because the printers or facsimile receivers proposed were too expensive, large and cumbersome for home use.

I have discovered that with my novel broadcast image receiver it would now be possible for a newspaper to supply a news service by broadcasting illustrated news bulletins with my novel image broadcasting system. Connected in the output of the usual radio receiver, it would be possible with my novel image receiver and recorder to receive and record such messages.

My invention contemplates that the owner of a radio receiver could, whenever he desires, switch the output of his receiver circuit to my image receiver for the reception of image or facsimile signals. Such a subscriber would, when he is about to turn off the radio at night, merely switch his circuit to the image recorder. During the night illustrated news bulletins, advertising, etc. would be transmitted and received on his radio receiver and in the morning would be available fully recorded.

In the present broadcast system, the programs are hampered by the inability to present a clear picture of the scene at the broadcasting studio, television still being a thing of the future. In accordance with my invention, each broadcast program could be preceded by or interspersed with a vision broadcast to provide the "listener" with some picture of the scene from which the broadcast occurs.

Accordingly an object of my invention is to provide novel apparatus for and methods of broadcasting images in conjunction with present audible programs.

A further object of my invention is to provide novel apparatus for and methods of broadcasting and receiving illustrated news bulletins on a regular sound radio receiver.

Still a further object of my invention is to provide a novel image receiving apparatus having considerable flexibility and operable from a standard sound radio receiver.

There are other objects of my invention which, together with the foregoing, will appear in the detailed description which is to follow in connection with the drawings in which:

Figure 1 is a circuit diagram of the transmitter;

Figure 2 is a circuit diagram of the receiver;

Figure 3 is a detailed view of the right hand side elevation of the transmitter;

Figure 4 is a cross section of the main shaft;

Figure 5 is a detailed drawing of the cam;

Figure 6:
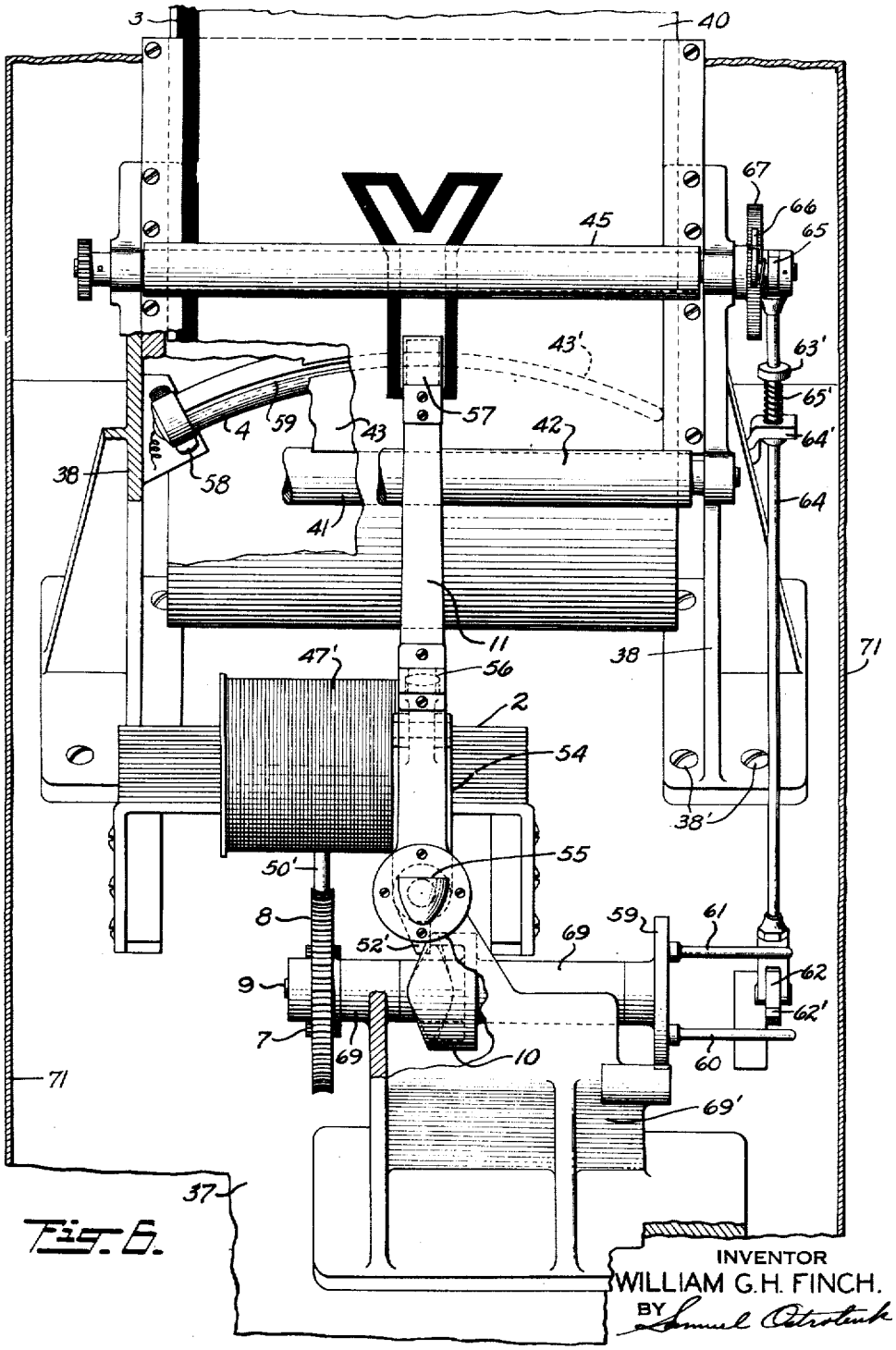
Figure 6 is a top view of the transmitter.

Referring to Figure 1, I have shown a developed positive film or similar band 1 moving in the direction of the arrow at a predetermined speed controlled by synchronous single phase motor 2 in a manner to be described hereinafter. Motor 2 may be driven from a standard source such as a sixty or twenty-five cycle line. Upon film 1, the image to be transmitted appears in black and for purposes of illustration, I have shown on Figure 1 an enlarged letter Y drawn in the middle of band 1. In this case, the letter Y is to be transmitted. On one side of the film 1, a relatively wide black line is drawn, which is shown at 3 in Figure 1, for synchronizing purposes to be explained hereinafter.

Behind the picture bearing transparent band 1, a photo-electric cell 4, shaped as a section of an arc, is suitably mounted and connected to a suitable amplifier which in turn is connected to the transmitter for transmitting signals. The transmitter for radio broadcasting may be an oscillator of carrier frequencies modulated by the picture currents generated by the photoelectric cell as the image to be transmitted is scanned in a manner to be described hereinafter. For wire transmission, a similar arrangement or just an impulse transmitter may be used.

When the single phase motor 2 is set in motion by closing switch 5, its armature 6 revolves in the direction shown by the arrow and the worm mounted at 7 on the armature shaft meshes with and drives worm gear 8. Gear 8 is mounted on and rotates shaft 9 in the direction of the arrow.

Shaft 9 carries secured thereto a cam 10 which, in revolving, causes cam follower 52′, carrying an image scanning device 11, pivoted at 12, to oscillate. Cam follower 52′ is held against cam 10 by a spring 53 (Figure 3) so that as shaft 9 rotates, arm 11 is swept back and forth over and scans the photograph appearing on band 1.

For puropses of simplicity, the mechanism which steps the photographic band 1 forward is not shown in this figure (to be described in connection with Figure 3), but at the completion of each cycle of scanning arm 11, the picture containing film is fed forward a predetermined amount, depending upon the quality of the picture desired, so that on each swing of arm 11, a new line of image points is scanned. All of this will be shown and described in greater detail hereinafter. It will now be clear that as motor 2 rotates, arm 11 oscillates in a sweeping movement back and forth over the picture to be transmitted and at the completion of every oscillation, a different line of the picture to be transmitted is scanned.

A suitable lighting system comprising a source of light of constant intensity, an objective lens and a reflector, capable of bending the light beam 90 degrees, is focused through the picture upon the photoelectric cell 4. It will be clear that whenever a dark or black portion of the image to be transmitted interposes the light beam between its source and the photoelectric cell 4, a variation in the current generated by the photoelectric cell in its circuit occurs. In the case of black and white transmission, only two current variations are produced. For transmitting shades between black and white a corresponding number of current variations result. In half tone transmission it would be necessary to break up the picture into sections in the manner well known in the art.

When these current variations are amplified and applied to the transmitting equipment, they will be radiated through the air or transmitted by wire to the receiving circuit and related apparatus shown diagrammatically in Figure 2.

Referring now to the receiving circuits shown schematically in Figure 2, a synchronous single phase motor is set in motion by closing the local circuit switch 14. This motor is preferably driven from a source of alternating current tied into the system supplying power to the transmitting motor 2. These two motors are thus driven in synchronism. To the armature of motor 13 is secured a worm 15 suitably mounted in bearings and driving gear 16, secured to shaft 17, in the direction indicated by the arrow. A synchronization disc 18, free to rotate about shaft 17, is located so that a pawl 19, under the action of spring 20, normally engages ratchet wheel 21, which is securely fastened to shaft 17. The synchronization disc 18 is secured to the hollow shaft 22 which is shown diagrammatically for simplicity at right angles from disc 18. Upon the hollow shaft 22 is secured a cam 23, shaped substantially like cam 10 in Figure 1, which in turn actuates cam follower arm 24, pivoted at 25, causing stylus 90 to oscillate back and forth over a suitable image retainer shown at 26, which travels in the direction of the arrow at a predetermined speed under control of motor 13.

The cam follower 24 actuates an arm 89 upon which is pivoted at 36 the stylus 90, the end of which is forked as at 24' and supplied with an arcuate iron armature 27 to cooperate with the pole pieces of a polarized magnet 28 having windings 29. When the magnet winding 29 is deenergized, the pole pieces act upon the armature 27 to hold the marker carried by stylus 90 out of contact with the signal recording band 26. When magnet winding 29 is energized by a signal, the armature 27 moves upwardly and causes stylus 90 to rotate about pivot 36 and thereby cause marker 93 to record the signal on band 26. By pivoting stylus 90 on the oscillating arm 89, a signal may be recorded by a mark corresponding to said signal at any position of said arm as it sweeps from side to side of its path of movement.

When switch 14 is closed, motor 13 is set in motion, thus imparting an oscillatory movement to stylus arm 90, said movement being in unison with the motion of arm 11 of the transmitter shown in Figure 1, so that arm 90 is at every instant in position to operate in response to a received signal. As soon as the styluses 11 and 90, now operating in synchronism, are also in proper phase relation, the system will be in condition for the transmission and reception of visual signals.

Synchronization and phase relation is accomplished by means of the synchronization slow-to-energize magnet 30 which actuates the armature and pawl 31 pivoted at 32 and held against stop 33 by tension spring 34 when the magnet is deenergized. Switch arm 35 is actuated by a projection on the periphery of synchronization disc 18 and is capable of closing its right or left contact, thus switching the incoming signal from visual signal responsive magnet 29 to the synchronizing magnet 30 and vice versa, according to the position in which arm 35 is located.

Assuming that the transmitter is in motion and is scanning the picture appearing on band 1 shown in Figure 1, each time arm 11 reaches its extreme left, an extra long impulse will be transmitted due to the black band 3 appearing in that location throughout the length of the transmitted picture. As explained hereinbefore, the black band is wider than will be obtained at any part of an image being transmitted, these images being usually word images. This results in the transmission of a synchronizing impulse or an impulse of extra long length, the results of which will be described hereinafter.

As the motion of arm 11 continues from left to right, and vice versa, the variations of light striking the photoelectric cell 4 due to the varied intensity of the picture interposed between the source of light and the photoelectric cell will be transformed into electrical impulses which are transmitted by the transmitter and associated equipment.

It will be understood, of course, that the light rays are so directed that no light is impinged on the photoelectric cell except the light beam coming directly toward it at right angles to its plane. Accordingly, in the illustration given, when arm 11 is directly opposite the dark portion or outline of the figure Y so that the direct light beam normal to the plane of the film 1 is interposed by a portion of the figure Y, no light reaches the photoelectric cell, since there are no light beams at any angle other than at right angles.

The result is that as the arm 11 scans the image, variable amounts of light are impinged on the photoelectric cell, all directly in proportion to the variations in the shades of the image, opposite the image at successive scanned portions of the image. Accordingly, currents varying in accordance with the shade variations flow in the circuit in which the photoelectric cell is connected and these currents are either radiated by modulating a carrier to a receiving station or are transmitted by wire.

Assuming now that motor 13 of Figure 2 is set in motion by closing switch 14, said motion will be transmitted through gear 16, shaft 17, ratchet 21, pawl 19, to synchronizing disc 18. This motion will continue in the direction of the arrow until that portion of pawl 19 which extends beyond the periphery of disc 18 will come in contact with the tongue of pawl 31, thus disengaging ratchet 21 from synchronizing disc 18. Disc 18 will be brought to a stop, in turn stopping hollow shaft 22 and the oscillating motion of arm 24' at the extreme left hand side of the receiving mechanism.

The position of pawl 31 with respect to pawl 19 is such that when pawl 19 engages the tongue of pawl 31, hollow shaft 22 rotates until arm 24' is at its extreme left position ready to sweep to the right. Inasmuch as arms 52' and 24 are driven by motors in substantial synchronism, arm 52' is similarly in its extreme left position for sending a prolonged long or synchronizing impulse.

With arm 11 on the synchronization band 3, a synchronizing signal is transmitted as previously described. At this time not only is pawl 19 engaged by the tongue of member 31, but the projection 18' has engaged the tooth of switch 35 which is sprung to the right (Figures 7 and 8) to engage its alternate contact. Accordingly the synchronizing signal received by the receiver is directed to the circuit including the slow-to-energize magnet 30 which thereupon is energized to actuate armature and pawl 31. Armature 31 rocks about its pivot 32 against the action of spring 34, disengaging the tongue of member 31 from pawl 19, which will immediately fall into one of the teeth of ratchet wheel 21, thus imparting an oscillating motion to receiving arm 24, so that the two arms 52' and 24 are now not only oscillating in synchronism but are also oscillating in proper phase relation in respect to their angular motion.

At the end of each revolution of the receiver synchronization disc 18, the pawl 19 is about to disengage itself from ratchet 21 by striking pawl 31. However, at this moment and just before such possible disengagement, the transmitting arm 11 is entering the synchronization band 3, thus transmitting a synchronization impulse, and inasmuch as switch arm 35 is at this time thrown so as to close its right hand contact 114, due to the pressure of the cam extension 18' on the periphery of synchronization disc 18 it will switch the incoming synchronizing signal into synchronizing magnet 30, allowing the pawl 19 to remain in mesh and to continue its rotary motion until transmission ceases.

The stylus 90 which rotates about pivot 25 in order to sweep from right to left over the picture retaining band, is also pivoted at 36 at right angle to its other pivot 25, so that the fork 24' is also permitted to oscillate up and down within the pole pieces 28 of polarized magnet 29.

It is therefore evident that as the receiving stylus 90 oscillates and the picture retainer 26 is moved along, every time arm 11 in Figure 1 passes over a dark portion of a photograph such as the one shown, it will transmit a facsimile signal which, when received at the receiving end, will act upon stylus 90 in such a way as to cause the marking end to come in contact with picture retainer 26, thus producing a marking in the same respective location as the dark portion on the transmitted photograph in a manner to be shown hereinafter. I therefore produce a picture identical to the one which is being transmitted but composed of lines closely grouped together, the quality of the picture depending upon the number of these lines per linear inch covered by the scanning arm of the transmitter and receiver.

In the system described above, receiver magnet energizing circuit flows to energize the image receiving magnet 29 or the synchronizing magnet 30 only when light is intercepted by a dark spot.

In a modified form of my invention, I contemplate having current flowing in the output of the photoelectric cell to actuate the transmitter, that current flowing to energize the synchronizing magnet 30 or signal magnet 29, as the case may be, when light is impinged on the protoelectric cell. At the receiver, a spring normally tends to operate stylus 90 into engagement with the paper, but is prevented from doing so by the energizing current in magnet 29. When a dark spot of the image is reached at the transmitter, an interruption in the signalling system occurs, resulting in a deenergization of magnet 29 and the consequent operation of stylus 90 against film 26 under action of its spring.

If preferred, the spring may be replaced by having the normal position of stylus 93 against film 26 and the energization of the magnet withdrawing the stylus from the film, as will be understood by those skilled in the art.

Or, if it is preferred to have a negative at the receiver, the stylus may, as in the present case, be operated into engagement with the film by energization of the magnet 29, in which case the light portions of the transmitted image will appear as dark portions and vice versa.

In this system, I may use a synchronizing impulse of different amplitude than any image impulse. The band 3 is not needed. Instead I may extend the photoelectric cell 4 beyond the edge of the picture as under the present band 3, replacing band 3 with a complete transparency greater than exists at the most transparent portion of the image film 1 so that when this portion is scanned, an increase in the photoelectric cell output current results in a corresponding increase in the receiver current amplitude. Relay 30, instead of being a slow-to-energize relay is responsive only to currents of this increased amplitude of the synchronizing current. If, therefore, the synchronizing current is received, relay 30 will operate in response thereto.

In another form, this increased synchronizing current may be obtained by terminating the photoelectric cell 4 just before the portion of strip 3 and placing a second photoelectric cell under present strip 3 more sensitive than cell 4 and therefore having a larger current output than the latter.

In the above I have not attempted to describe the details of the apparatus for carrying out my invention. Figures 1 and 2 are merely schematic circuit diagrams which illustrate in a general way the principles of my invention.

I shall now describe the various parts in detail. In Figure 3 I show a detail drawing of the right hand side elevation of the transmitter. Upon a frame 37 two uprights 38 are suitably mounted and are so shaped as to support a mandril 39 upon which the picture to be transmitted consisting of a roll 40 is mounted, free to rotate around the mandril 39.

The film roll 40 consists preferably of a translucent substance which will permit variable amounts of light to pass through at different points, depending on the picture but may, if preferred, merely consist of a roll on which an image is printed and which reflects varying quantities of light, depending on the image. Roll 40 passes between rollers 41 and 42, hence over platen 43 and is propelled forward in the direction shown by the arrow by rollers 44 and 45 in a manner to be described hereinafter. Upon the same frame 37 the synchronous motor 2, of any well known construction consisting of a field winding 47', core 48' and armature 49', is shown and is located so that its driving shaft 50', suitably supported in bearings, has secured thereto the worm 7 rotated by the drive shaft. Worm 7 is in proper mesh with worm gear 8. Gear 8 is secured to and imparts rotary motion to shaft 9 upon which cam 10 is securely fastened.

Bearing against cam 10 is a cam follower 52' (Figure 4) secured to and driving shaft 12. Coiled about shaft 12 is a spiral spring 53, one end of which is secured to arm 54 and the other end bearing against the bracket 69. Cam follower 52' is thus normally held in engagement with cam 10 by the action of coil spring 53.

At the other extremity of shaft 12, arm 54, securely connected to the shaft, carries the optical system of the device consisting of a source of light 55 mounted in a light beam reflector or director which limits the beam to light rays in a single direction as shown. These light rays are properly focused by objective lens 56 into a prism 57 which in turn reflects the single pencil of light rays at right angle to photoelectric cell 4 which, together with a portion of the platen 43 and rollers, is shown in cross-section.

Before impinging on the photoelectric cell, the ray of light must first pass through the image containing film and through the slit 43' of platen 43 provided for the purpose. By reason of the construction of reflector 57 and its relative position to the film, all of the light passes at right angles to the film and only through that portion of the film directly opposite the light reflector 57.

The operation of scanning should now be clear. With the armature shaft 50' of motor 2 rotating, worm 7 drives gear 8 to in turn rotate shaft 9 and cam 10.

As cam 10 rotates, cam follower 52' is oscillated back and forth, in turn rocking shaft 12. The source of light 55 and its associated mechanism is correspondingly oscillated, providing a sweeping movement for reflector 57 and thus moving the light beam from point to point on the image from one edge to the opposite edge, scanning a single arc line of the image.

Following the scanning of an arc line of the image, the film is stepped a sufficient distance to present a new arc line for scanning. This will now be described.

The film feeding mechanism comprises disc 59 which is secured and rotatable with shaft 9 and therefore revolves with worm gear 8. Upon disc 59 two pins 60 and 61 are secured and as the disc revolves, they come in contact with the projection 62' of arm 62 pivoted at 63. As the pins continue to rotate, they impart a reciprocating motion to connecting link 64 secured at one end to arm 62 and at its opposite end to arm 65. As link 64 reciprocates, it in turn actuates arm 65 upon which pawl 66 is held under tension against a tooth of ratchet 67 by spring 68.

As shown, link 64 has secured thereto the collar 63', and slides in bracket 64' fastened to upright 38. When link 64 is moved to the left in the manner described above, collar 63' compresses the spring 65', interposed between the collar 63' and bracket 64', so that when pin 61 passes beyond and releases arm 62, link 64 is returned to the position shown. Reciprocating motion is thus imparted to link 64, resulting in moving pawl 66 to turn ratchet wheel 67 and then returning the pawl 66 to engage a new tooth.

It will be understood from the description to this point that the position of pins 60 and 61 is such that they respectively engage arm 62 when the arm 11 has been swung to either of its extreme positions and is about to return so that the roll is fed one step and the return of the scanner stylus is effected over an adjacent line to be scanned.

In Figure 4 I show a section through the main shaft 9 of the transmitter mounted in the bearing 69 formed in a bracket 69' and I show in detail worm gear 8 secured to and rotating shaft 9 to which is also secured for rotation therewith cam 10 and paper feed disc 59. In the same figure, finger 52' is shown in its respective location with cam 10.

Figure 6 is a top view of the transmitter with portion of it cut away to show the respective position of the photoelectric cell to the platen and the film.

Upon base 37, the two uprights 38 are securely mounted as at 38'. The roll of film containing the image to be transmitted is also shown at 40 while rollers 42 and 45 are shown in their respective location. The main bearing 69 supports shaft 9 upon which worm gear 8, cam 10 and film feed disc 59 are secured. The scanning arm 11 carried by arm 54 is shown in a central position while the optical system, consisting of source of light 55, objective lens 56 and prism 57, is shown mounted thereupon in the proper location.

Under platen 43, a portion of the photoelectric cell 4 is shown together with suitable mounting means. The photoelectric cell 4 is arcuate in shape and is supported at its extreme ends in fittings 58 by means of which circuit connections are made from the photoelectric cell to the transmitter. As shown, a slot 59 permits the narrow pencil of rays equal to the thickness of the line to be scanned to impinge upon the photoelectric cell. It will be noted that the arc covered by the arm 70 is the same as the arc of the photoelectric cell, so that in every position of the reflector 57, it is opposite a point of the photoelectric cell. The operation of the transmitter is as follows:

When the circuit of the synchronous motor 2 is closed, its armature rotates, which in turn will drive worm 7. The worm gear 8, therefore, will rotate in the direction shown by the arrow, carrying with it its cam 10, and inasmuch as finger 52' bears against it and is held in that position by spring 53 (Figure 3), it is evident that arm 11 will oscillate from left to right at a speed determined by the synchronous motor.

As shaft 9 revolves, pins 60 and 61 will come in contact with arm 62 and will rock it in the direction of their motion, carrying with it connecting rod 64 and rocker arm 65 (Figure 3) so as to impart an intermittent rotating motion to ratchet 67, causing the film to advance a predetermined amount.

If the circuit controlling the source of light is closed, a very sharp beam of light will be focused upon the photoelectric cell 4 and as this beam is intercepted by the dark portion of the picture appearing on film 40, a corresponding change will occur in the amplifying circuit to which the photoelectric cell is connected, thus transforming light changes into electrical changes. It is obvious that the entire transmitting unit is to be light tight and therefore a cover 71 protects the entire unit from external light and dust. This completes the description of the transmitting apparatus and a detailed description of the receiving apparatus with its corresponding parts will now be given.

Figures 7, 8:
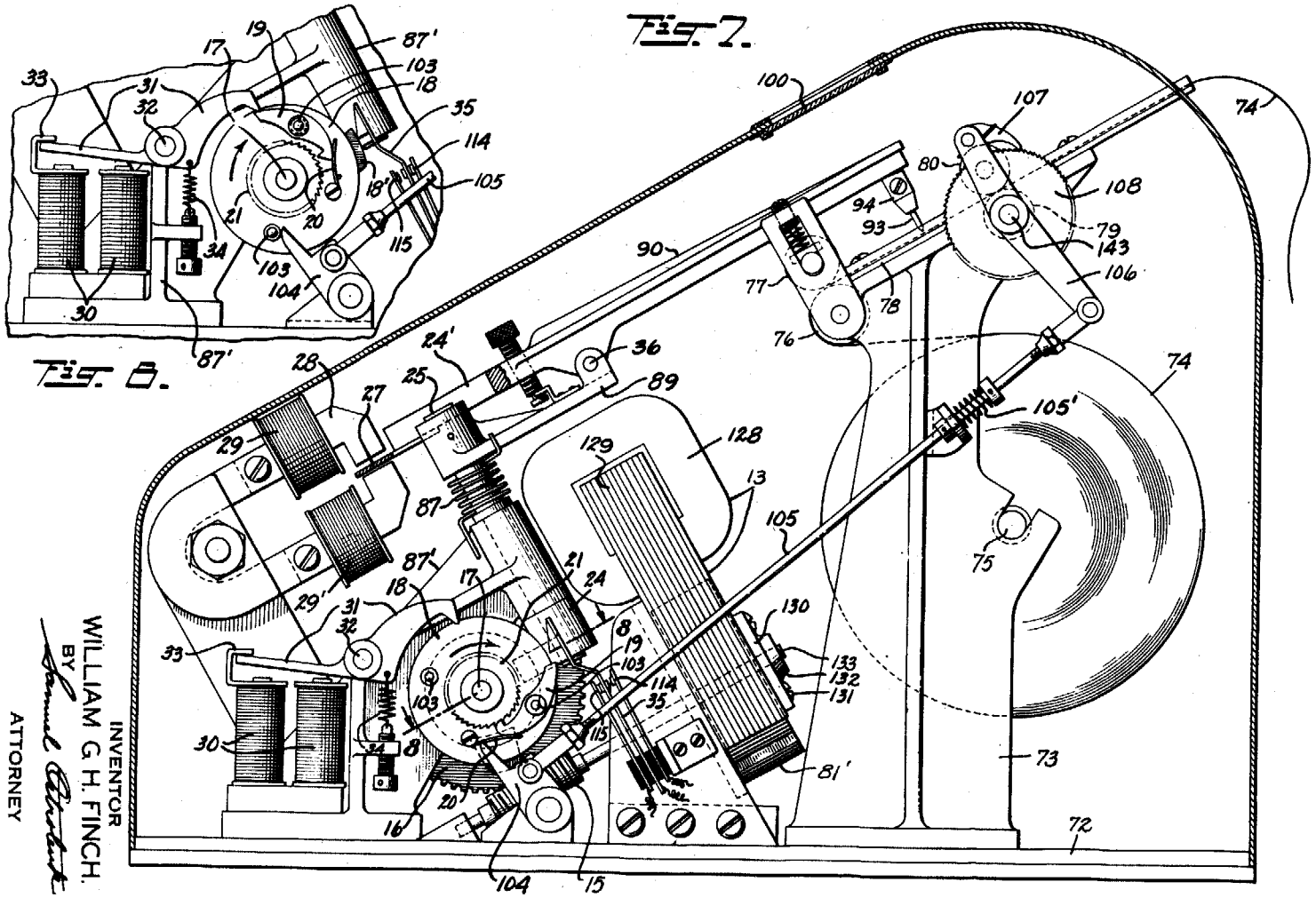
Figure 7 is a right hand side elevation of the receiver.
Figure 8 is a detailed view of synchronization mechanism.

Figure 7 shows the right hand side elevation of the receiving unit which consists of a base 72 upon which are mounted a pair of uprights, one of which is shown at 73. A roll of paper 74, coated with a substance which is to be described hereinafter, is free to rotate around shaft 75. Said paper passes between rollers 76 and 77 over platen 78 and under feed rollers 79 and 80. A synchronous motor 13, similar to the described in detail in connection with the transmitter, is provided with an armature 81' which drives the worm 15, meshing with gear 16, which is secured to and drives shaft 17. Motor 13 is in mesh with worm gear 16 by means of worm 15. Shaft 17 also carries a cam 23 identical to cam 10 of the transmitter unit and a synchronization disc 18 which revolves in the direction shown by the arrow.

As in the case of the transmitter, cam 23 actuates cam follower 24 which is secured to and rotates the shaft 25. Secured to and rotatable with shaft 25 is arm 89. A spring 87, one end of which engages the arm 89, the other end of which engages the standard 87', normally holds the cam follower 24 against cam 23, all shown in Figure 9, imparting to shaft 25 and to arm 89 an oscillatory motion synchronous with that of arm 11 at the transmitter. The arm 89 carries in its motion the stylus 90 which is pivoted at 36 for a second rocking movement to and from the place of the paper 74.

At one end of the stylus 90, a suitable marker 93 is fastened into retainer 94 while at the other end an iron segment 27 passes between the poles of a polarized magnet 28 whose winding is shown at 29 and 29'. Figure 8 is a detailed view of the synchronization mechanism and it is shown in the position which the machine will assume when the transmitter ceases to function at the transmitting end. For the sake of simplicity, in Figure 8 the worm 15 and the worm gear 16 are not shown. Upon the same disc paper feed pins 103 are diametrically located so as to engage at every revolution an arm 104 which in turn feeds the paper out by means of connecting rod 105, rocker 106, pawl 107 and ratchet wheel 108. By referring to Figure 8, it will be noted that as soon as the synchronization magnet 30 is energized, its armature 31, pivoted at 32, will release pawl 19 which in turn under control of spring 20 will move its tooth to engage a tooth of ratchet wheel 21 which, being fastened to shaft 17, is revolving in the direction shown by the arrow.

It is to be understood that in the receiver mechanism, synchronization disc 18 is not secured to shaft 17, but by means of a hollow shaft 22, loosely mounted and revolving around shaft 17, is connected to cam 23, thereby arresting the motion of cam 23 when the receiver assumes the position shown in Figure 8.

In the same Figure 8, an insulating projection 18' is secured at the periphery of synchronization disc 18, causing switch arm 35 to close either its right or left hand contact 114 and 115 respectively. In Figure 8 the right hand side contact 114 is closed and by referring to Figure 2, it will be noted that the first impulse that will be received will be switched to magnet 30, thus releasing pawl 19 and causing stylus 90 to oscillate over the specially prepared paper. It is to be noted that one of the pins 103 serves as the pivotal support for the pawl 19 on synchronization disc 18. This is better shown on Figure 12 and it is therefore evident that at each half revolution of synchronization disc 18, arm 104 will be acted upon, thus imparting an intermittent rotating motion to ratchet wheel 108, advancing the paper an amount equal to that in the transmitter. It will be understood that the reciprocating motion of link 105 for oscillation arm 106 is accomplished by the movement of arm 104 together with the compressor 105', in the manner described in detail in connection with the transmitter.

As a result of pawl 19 being enmeshed by ratchet wheel 21, the synchronization disc 18 will revolve in the direction indicated by the arrow, and inasmuch as projection 18' will not be opposite switch arm 35, the latter will close its left hand contact 115, deviating all incoming facsimile signals into magnets 29 and 29', as diagrammatically shown in Figure 1.

It is now evident that facsimile signals received while the stylus arm 90 is sweeping over its arcuate path, are switched to act upon magnets 29 and 29', and armature 27 will cause the stylus to move up and down about pivot 36, bringing the marking point 93 in contact with the specially treated paper passing over platen 78. Assuming the stylus is in a position corresponding to the position of the transmitter scanner 11, and the signals of the proper amplitude and timing, they will produce markings upon the specially treated paper at a corresponding portion thereon of a length equal to the image at that point, thus reproducing the original picture in the form of dashes closely grouped together, which will form an image similar to the one transmitted.

Figure 9:
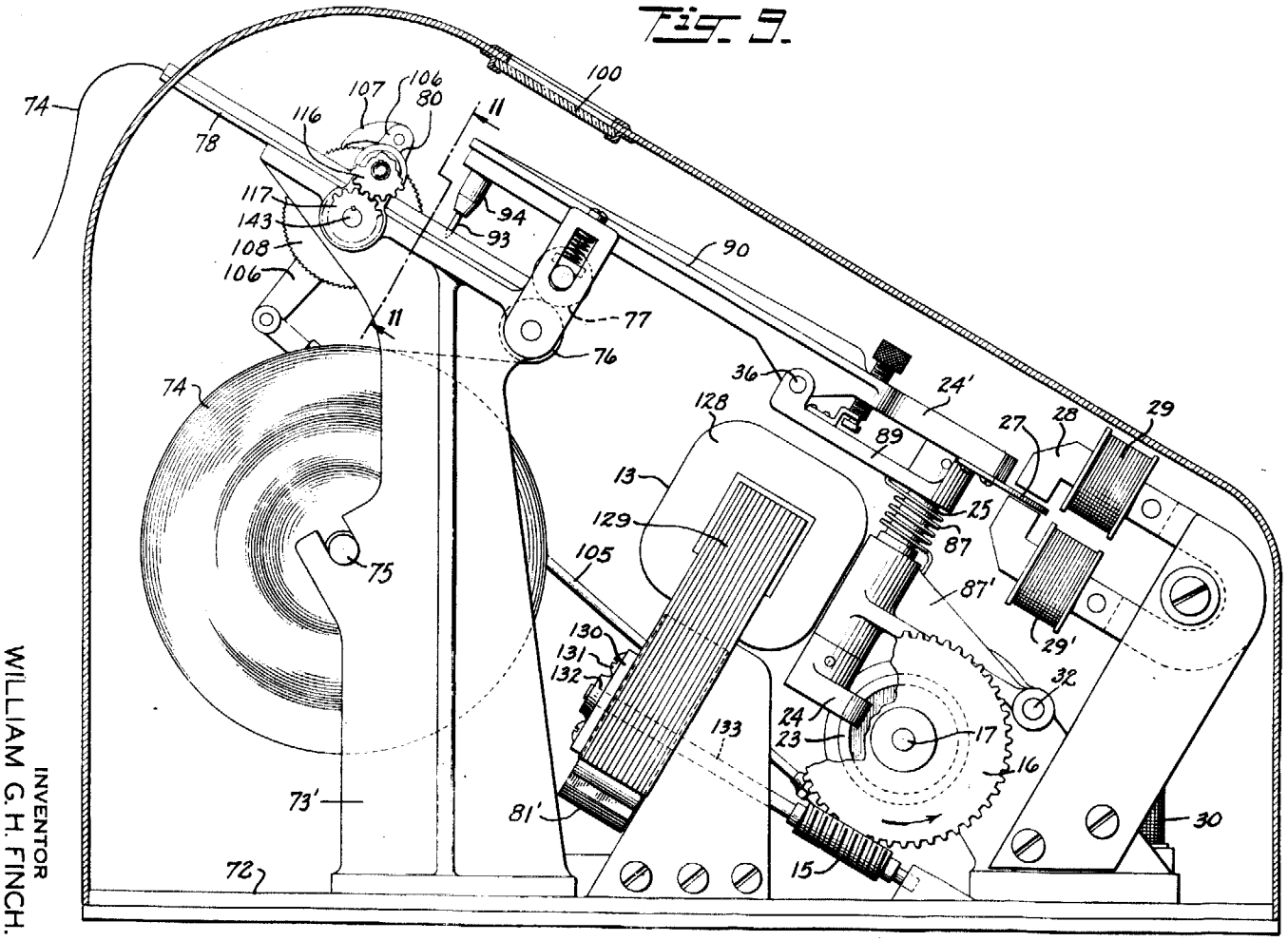
Figure 9 is a left hand elevation of receiver.

In Figure 9 I show the left hand elevation of the receiver where a clear understanding of the respective position of synchronous motor 13, worm 15 and worm gear 16 may be seen.

I have cut a portion of the worm gear 16 in order to show follower 24 bearing against cam 23.

In order to secure a positive motion of the sensitized paper 74, the rollers 79 and 80 are positively drawn by pinions 116 and 117, the latter being mounted in rotatable relation with the shaft 143 which carries ratchet wheel 108.

Figure 10:
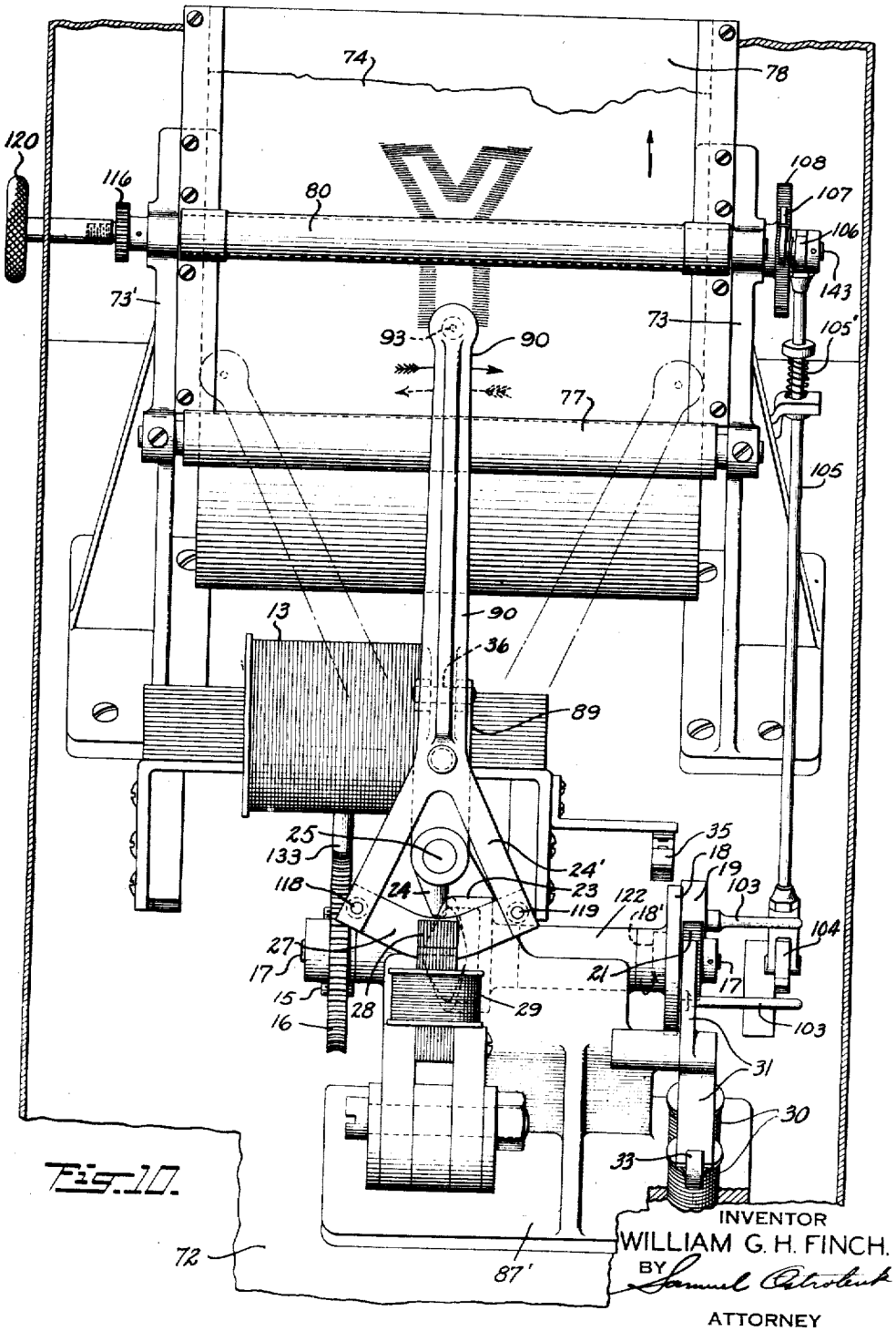
Figure 10 is a top view of receiver.

In Figure 10 I show a top view of the complete receiver. The stylus 90 is shown in a central position and the dotted lines indicate the maximum swing from side to side. It will be noted that this member is forked at one end 24' in order to accommodate armature 27 to which it is secured by rivets 118 and 119.

As the stylus arm 90 sweeps over the sensitized paper 74, armature 27 will oscillate between the pole pieces of the polarized magnet 28. Inasmuch as stylus arm 90 is also pivoted at 36 and is free to move in an upward and downward motion, it is evident that any signal received by said polarized magnet 28 will act upon stylus 90, forcing the marking point 93 (Figure 7) to bear down on the sensitized paper, thus causing a marking similar in length to the one appearing in the film 40 of the transmitter.

This sensitized paper may be wax covered, carboned, photographic light sensitive, chemically treated, or any other well known type, and I do not wish to be restricted by the type to be used.

When a record is made on carbon, waxed paper and the like, provision is made for rendering the record immediately visible. This I accomplish by the transparent glass window 100 placed in the receptacle, so that an observer can immediately see the record.

In order to simplify the operation of reading the sensitized paper under the various rollers, I have provided a knob at 120 which may be revolved by hand, thus causing any amount of paper to be drawn from the paper supply.

Figure 11:
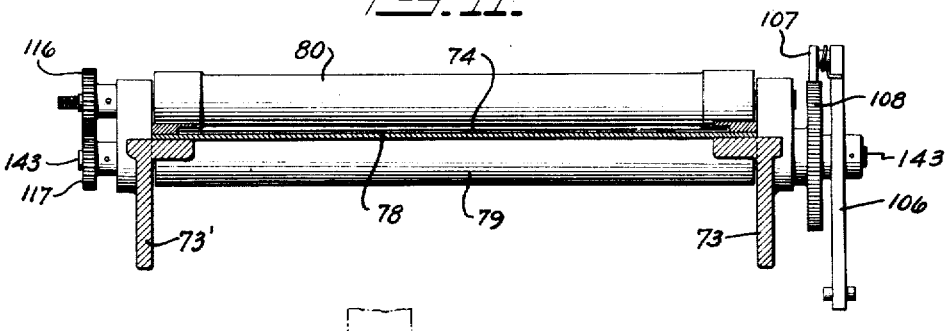
Figure 11 is a detailed drawing of roller mechanism.

Figure 11 is a section taken at 11—11 on Figure 9. In this drawing I show the section through the uprights 73 and 73' supporting the platen 78 over which the sensitized paper 74 is carried forward by rollers 79 and 80, moved together by pinions 116 and 117.

Figure 12:
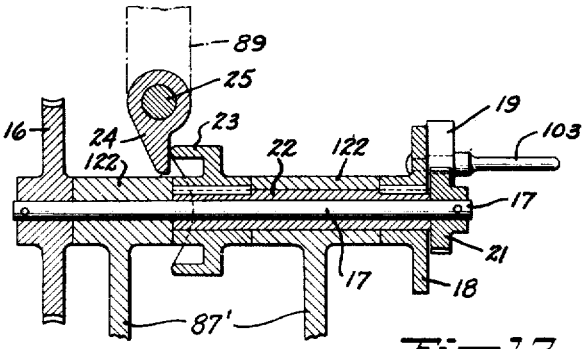
Figure 12 is a section through the main shaft of the receiver.

Figure 12 is a cross section through the main shaft 17 of the receiver. Upon this shaft the worm gear 16 and the ratchet wheel 21 are secured and the entire assembly rotates in bearing 122 formed on bracket 123.

A hollow shaft 22 rotates freely around main shaft 17 and has keyed thereon at one end the receiving cam 23 and the synchronous disc 18 at the other.

Figure 13:
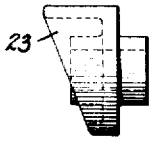
Figure 13 is a detailed view of the receiving cam.

Figure 13 is a detailed drawing of the receiver cam 23 which is identical to Figure 5 showing the transmitting cam 10.

Figure 14:
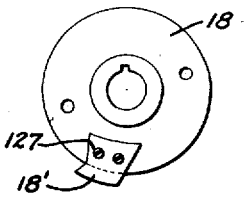
Figure 14 is a detailed view of the synchronous disc.

Figure 14 is a detailed view of the rear of the synchronization disc 18 showing the switch actuating projection 18', securely fastened to it, by means of screws 127 and located so that it projects beyond the periphery of the disc itself.

Figure 15:
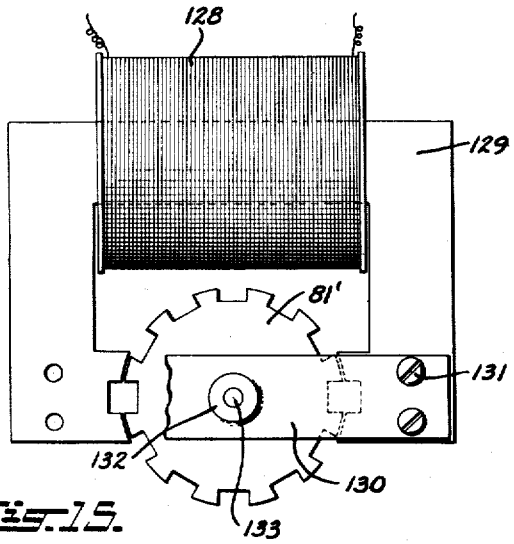
Figure 15 is the synchronous motor.

Figure 15 is an assembly drawing of the single phase synchronous motor which I prefer to use. This motor consists of a coil 128 mounted over a core 129 substantially of the design shown in this figure. A non-magnetic bridge 130 is secured to the core 129 by means of screws 131 and forming at 132 a bearing for the motor shaft 133.

While I show a simplified form of synchronous motor, it is understood that one employing a self-starting principle such as single phase motors employing shading coils may be used, provided they do maintain a constant synchronous speed if not over-loaded.

Figure 16:
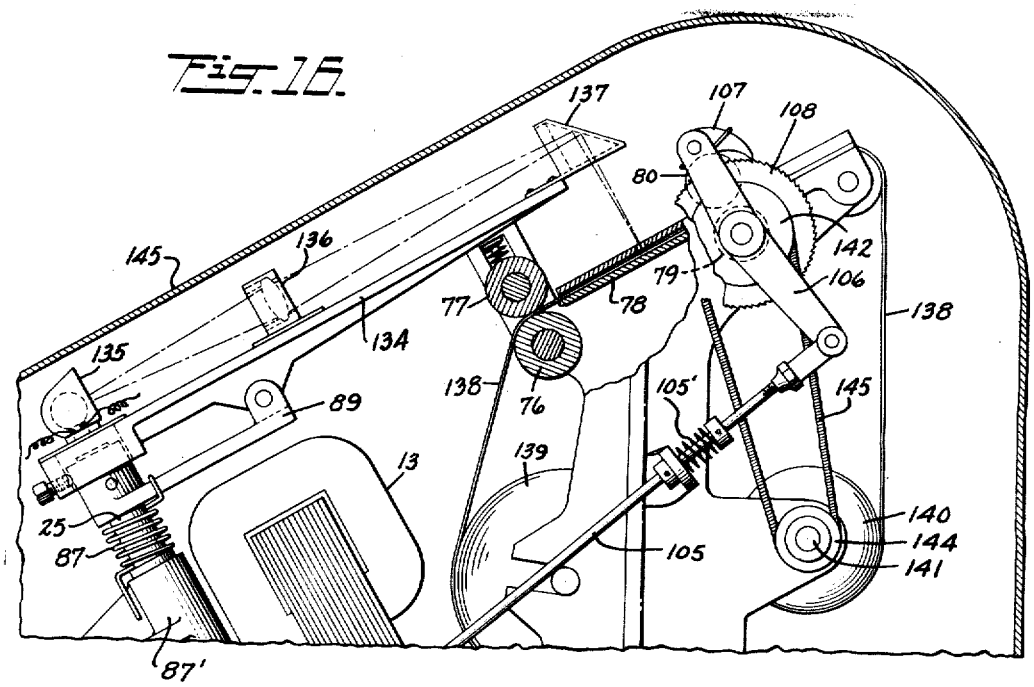
Figure 16 is a drawing showing a modification of the invention for the reception and transmission of half tone pictures.

Figure 16 is a modification of my invention to make possible a reception of half tone photographs. In this figure I only show that portion of the receiver which needs to be modified, while the other portion of mechanism remains unaltered.

In this modification I substitute the stylus 90 of the receiver's mechanism with a similar member 134 substantially capable of being shaped as shown.

I also eliminate the receiving polarized magnet 28 and substitute an optical system substantially similar to the one shown in Figure 3 and consisting of sources of light 135 focused by an objective lens 136 upon prism 137, bending the light 90 degrees and focusing it upon the light sensitive paper 138 supplied in roll form at 139. After the paper has been exposed, it is fed forward by the same mechanism previously described and the exposed sensitized paper is allowed to accumulate in roll form over take-up roller 140 pivoted at 141, or may first be passed through a developer and fixer, and then through a drier, after which it is permitted to accumulate on rolls. A groove pulley 142, secured to the paper feed shaft 143, is connected to the take-up groove pulley 144, secured to take-up roller shaft 141, by means of spring belt 145 which tends to rotate the take-up roller faster than the paper is expelled, thus keeping the paper 138 always taut. The entire receiving mechanism is protected by light-proof casing 145 which protects the device from extraneous sources of light, dust and grit.

If the paper 138 is coated with a substance which is affected by light proportionate to its intensity, any variation of light intensity of source of light 135 will correspondingly produce a variation of intensity of the light beam which strikes the sensitized paper, thus producing an image identical to the one transmitted by the transmitter.

Figure 17:
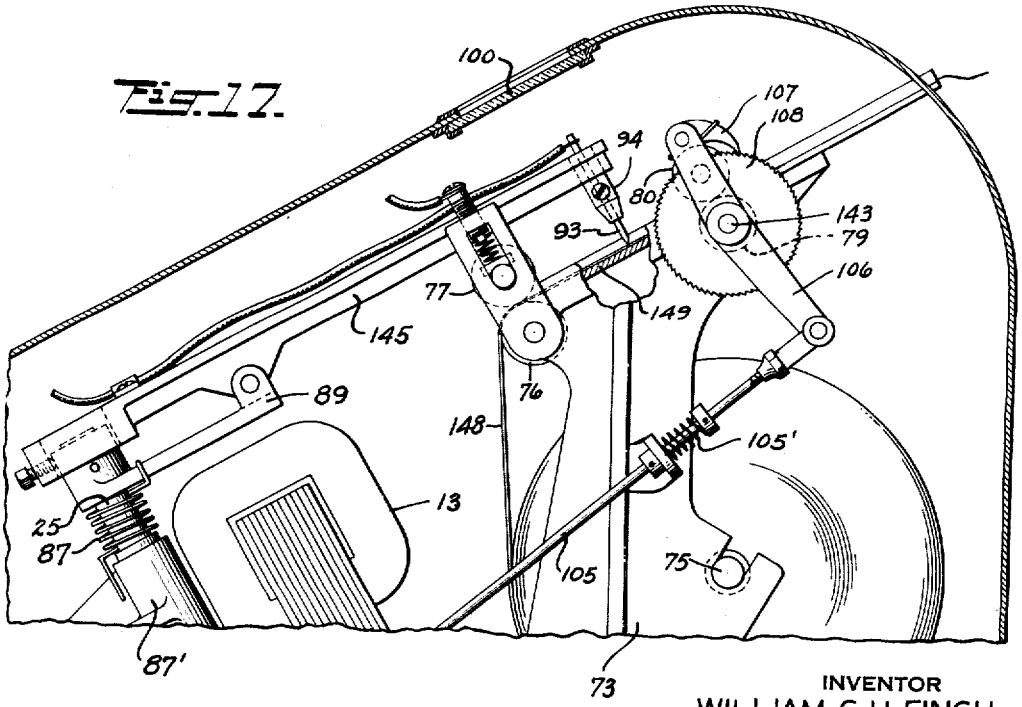
Figure 17 is a modification of portion of the receiver showing an electrochemical method of reception.

In Figure 17 I show another modification of my invention in which the stylus 90 is substituted by a pointer 145 constantly lightly bearing upon a specially treated paper 148.

The pointer 147 is electrically insulated from the machine by suitable means and is connected to one side of the circuit while the other is grounded to the frame of the machine.

Paper impregnated with a solution of various salts has the property of discoloring when interposed between two differing polarities of an electrical circuit and I use this principle to record images by utilizing a paper so treated and interpose it between the pointer 147 and frame 149.

Figure 18:
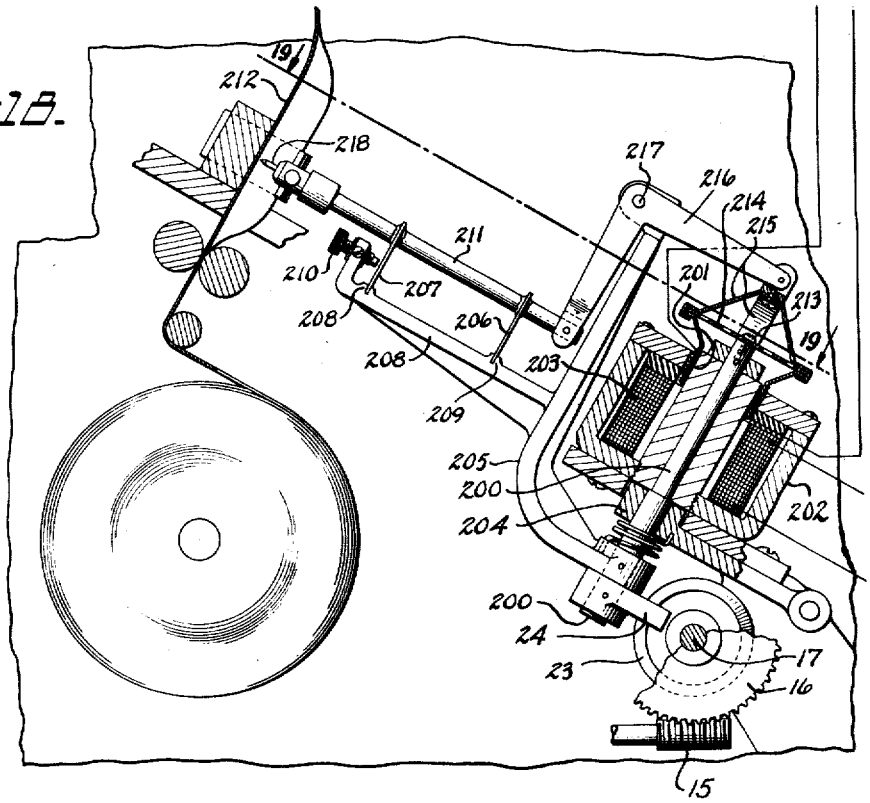
Figure 18 is a modification of the receiver employing an electrodynamic motor and arc-shaped platen.

In the receiver described hereinbefore, the receiver stylus moved in an arc over a flat sheet. In the modification shown in Figures 18 and 19, while the angular motion of the stylus is maintained, linear scanning of the picture is obtained in a straight line across the transmitter and the receiver picture, the sheet being arced as distinguished from the flat sheet described hereinbefore.

The marking power is supplied by a dynamic unit which makes it possible to connect the receiver in place of the present loud speaker in a radio receiver as generally found in the average home.

In this modification, the finger 24 is actuated by cam 23 and oscillates shaft 200. Shaft 200 oscillates in bearings 204 and carries at one end an arm 205. Anchored to arm 205 by suitable means at 208 and 209, the resilient stylus supports 206 and 207 are in flexible connection with the stylus.

Figure 19:
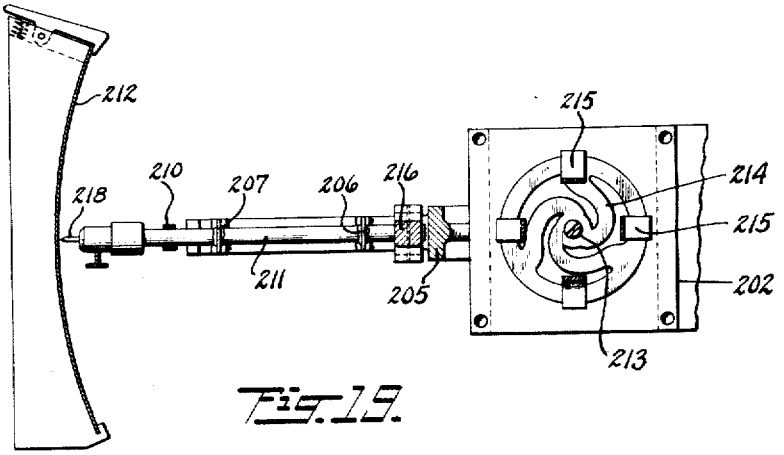
Figure 19 is a top view of Figure 18 taken at 19—19.

As the shaft is oscillated, the arm 205 rocks back and forth carrying with it the stylus arm 211 which moves in an arc, as shown in Figure 19.

The oscillatory movement of shaft 200 is also transmitted to the moving coil 201 of the electrodynamic motor 202, having windings 203.

Moving coil 201 is securely fastened to the oscillating shaft 200 by a screw 213 which holds the coil in place. However, it permits coil 201 to move up and down in response to received signals, due to the resilient membrane 214, so shaped as to obtain the motion of the coil 201. This motion by means of a spider frame 215 is transmitted to the bell crank 216, pivoted at 217. The bell crank 217 is at one end secured to the stylus 211 carrying at its extremity the pointer 218.

The winding of coil 203 is energized by the direct continuous current available in the ordinary radio receiver. The moving coils 201 are connected to the output of the last tube. When now a signal is received causing the moving coil 201 to oscillate in and out of the magnetic field of coil 203, it will cause stylus 211 to oscillate in such a manner as to come in contact with the paper 212 and produce an image similar to the one transmitted, with any of the methods previously described. To limit the motion of these members 206 and 207, I have provided the screw adjustment 210, which prevents stylus 211 from digging into the paper 212 as the picture is being recorded.

Figure 20:
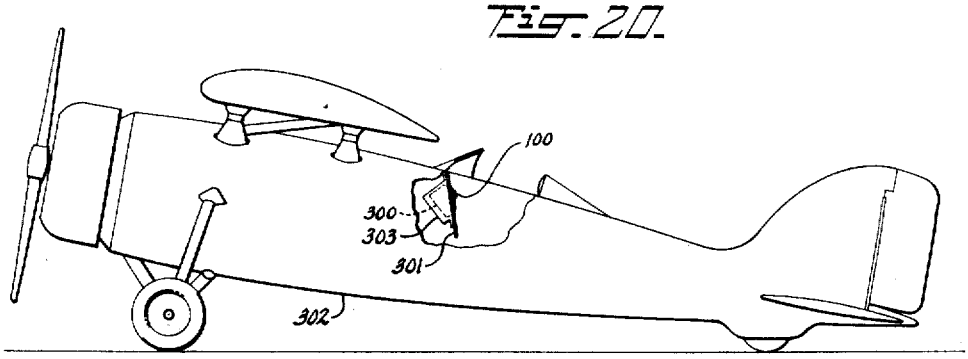
Figure 20 is a side plan view of an airplane in which my novel receiver is mounted.
Figure 21:
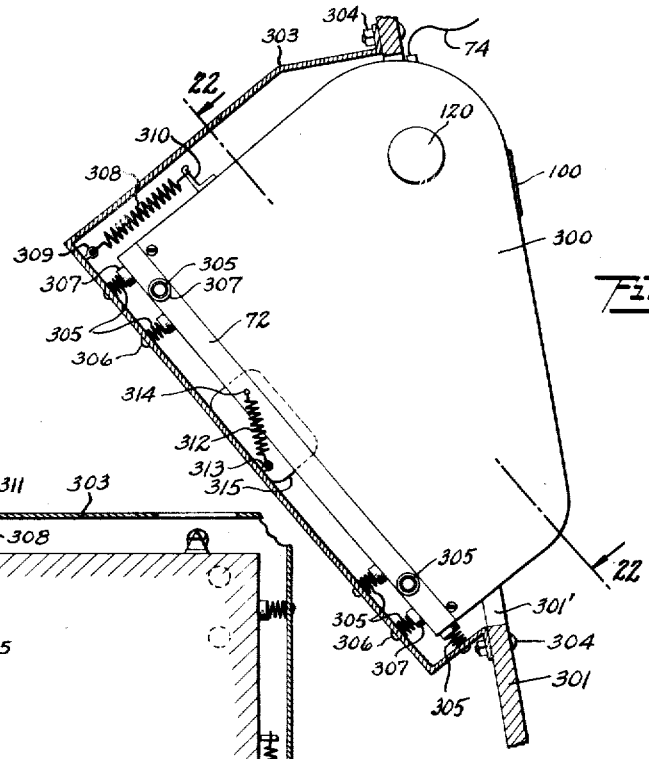
Figure 21 is a side elevation showing the details of mounting my receiver.
Figure 22:
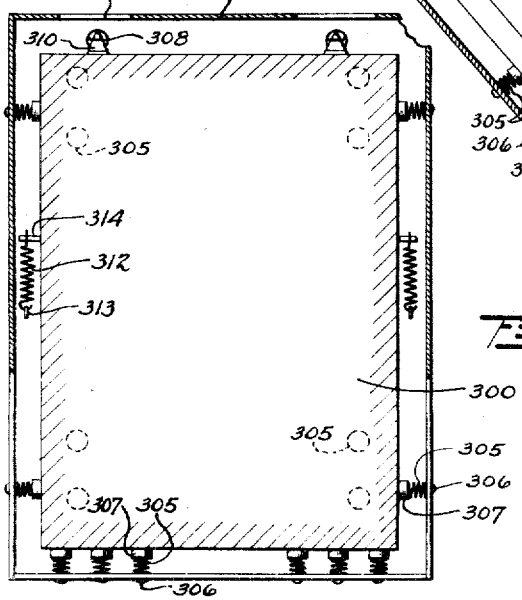
Figure 22 is a cross section elevation taken at 22—22 of Figure 21.

In Figures 20 to 22 I have disclosed a method of mounting my vision recorder on an airplane.

In Figure 20 the receiving instrument 300 is mounted on the instrument board 301 of the airplane 302. As shown in Figure 21, an opening 301' is provided in the instrument board 301 in which the instrument 300 is set. Secured to the instrument board 301 by bolts 304 is a casing 303 which provides a support for the instrument board through the compression springs 305 which are riveted at one end to the casing 303 by rivets 306 and are mounted at its other end in the bearing caps 307.

At the rear of the instrument I have provided tension springs 308 with the anchors 309 and 310.

As shown in Figure 22 hand holds 311 are provided in the casing 303 to enable the mounting of the springs 308. Tension springs 312 are also provided for preventing upward movement, the tension springs 312 being mounted in the anchors 313 and 314. A hand hold 315 enables the mounting of the springs 312. By this arrangement the shocks and jars to which the airplane is subjected are not transmitted to the instrument which in effect floats in position by reason of the several spring mountings.

Although I have illustrated my invention as applied to the general transmission of vision, I also intend it for other uses to which it is especially adapted. Thus, for example, my invention contemplates operating the switch 320 from a radio receiver to the facsimile system shown in Figure 2. With this arrangement the owner of a radio receiver of the standard type may switch from the reception of ordinary broadcasts to the reception of vision for the purpose of obtaining visual record of the broadcasting station.

In another form my invention contemplates enabling the owner of a radio receiver to switch his receiver to the visual recorder for operation during the interval to receive illustrated news bulletins.

It will be obvious from this that my invention may take several forms and I do not wish to be limited except as set forth in the appended claims.

I claim:

1. A facsimile system having a transmitter; a receiver; a facsimile signaling channel connecting said transmitter and receiver; continuous synchronous positive driving means at said transmitter and receiver; a positive drive connecting means between said driving means and said receiver; means for disconnecting said drive connecting means from between said driving means and said receiver for rendering said driving means and said receiver non-effective; and means operative in the event the receiver is in synchronism with said transmitter for preventing said disconnecting means from operating.

2. A facsimile system having a transmitter; a receiver; a facsimile signalling channel connecting said transmitter and receiver; continuous synchronous positive driving means at said transmitter and receiver; a positive drive connecting means between said driving means and said receiver; means for disconnecting said drive connecting means from between said driving means and said receiver for rendering said driving means at said receiver non-effective and for simultaneously preparing to render itself non-operative in the event that said transmitter and receiver are in synchronism.

3. In a facsimile system; a transmitter, a receiver; a signalling circuit connecting said transmitter and receiver; a positive drive for said receiver facsimile and synchronizing apparatus at said receiver; switching means at said receiver for separately switching said facsimile and synchronizing apparatus to said signalling circuit; and means whereby when said synchronizing apparatus is connected to said signalling circuit, said facsimile apparatus and drive therefor are rendered non-operative until a synchronizing impulse is received.

4. In a facsimile system; a receiver comprising a pivoted arm; a rotatable motor; means for translating the rotation of said motor into a reciprocating motion for rocking said arm about its pivot in a reciprocating movement for line for line scanning; a second pivot at right angles to said first pivot; and means responsive to received facsimile signals for rocking said arm about said second pivot.

5. In a facsimile system; a receiver having an arm; a pivot for said arm; a rotating motor; a cam; means including said cam for translating the rotary motion of said motor into oscillating motion for rocking said arm in a reciprocating motion about its pivot; an image carrying film over which said arm sweeps in its movement for scanning an image; and means whereby said motor feeds said film a single step following each complete sweep of said arm whereby said arm scans a new line, and means for rocking said arm transversely to said reciprocating motion into and out of engagement with said film in response to received impulse conditions.

6. In a visual signalling system, a receiver comprising a movable coil unit, a central axis on which said coil is mounted for rotation thereabout, a field of substantially constant magnetic intensity, means responsive to received picture signalling currents for energizing said coil to operate it in said field of constant magnetic intensity, a scanner mounted on said axis for rotation thereabout in synchonism with the received picture signals and means on said scanner controlled by said movable unit for recording an image in accordance with the said picture signals.

7. In a visual signalling system, a receiver comprising a movable coil, a central axis on which said coil is mounted for rotation thereabout, means for energizing said coil in accordance with received picture signals, a scanner mounted on said axis for rotation thereabout in synchonism with the received picture signals and picture recording means controlled by said coil for producing a record in accordance with the received picture signals.

8 In a visual signalling system, a receiver comprising an electron amplifier, a source of power for operating said amplifier, a floating coil connected to said amplifier, a central axis on which said coil is mounted for rotation thereabout, a magnetic field energized by said source of power, a scanner mounted on said axis for rotation thereabout in synchonism with the received picture signals and circuit means for connecting said floating coil to the output of said amplified whereby said scanner is controlled by received picture signals energizing said electron amplifier and variably operating said floating coil in said field.

9. In a visual signalling system, a receiver comprising a stationary winding for generating a magnetic field, a movable winding operable in a magnetic field produced by said first winding, a central axis on which said movable winding is mounted for rotation thereabout, a scanner mounted on said axis for rotation thereabout in synchronism with the received picture signals, means for energizing said movable winding in accordance with received picture signals, and means controlled by said movable winding for recording an image in accordance with the operation of said movable winding by said received picture signals.

10. In a visual signalling system, a receiver comprising a stationary winding for generating a magnetic field, a movable winding operable in the magnetic field produced by said first winding means for energizing said movable winding in accordance with received picture signals, a central axis on which said movable winding is mounted for rotation thereabout, a scanner mounted on said axis for rotation thereabout in synchronism with the received picture signals, and means on said scanner controlled by said movable winding for recording an image in accordance with the operation of said movable winding by said received picture signals, said last means comprising a stylus and mechanical connection from said movable winding to said stylus.

11. In a visual signalling system, a fixed winding having a central opening, a shaft extending through said central opening, a movable winding, a supporting means connected to said shaft and secured to said movable winding whereby said movable winding is supported for movement with respect to said first winding, a stylus, a mechanical connection from said movable winding to said stylus, means controlled by said shaft for operating said stylus to scan in synchronism with the received picture signals and means for energizing said movable winding in accordance with received picture signals for vibrating said movable winding with respect to said first winding and producing a corresponding vibration of said stylus.

12. In a visual signalling system, a fixed winding having a central opening, a shaft extending through said central opening, a movable winding, a supporting means connected to said shaft and secured to said movable winding whereby said movable winding is supported for movement with respect to said first winding, a record controlling means mounted for rotation about said shaft, means for operating said record controlling means in synchronism with the received picture signals, a mechanical connection from said movable winding to said record controlling means, and means for energizing said movable winding in accordance with received picture signals for vibrating said movable winding with respect to said first winding and producing a corresponding operation of said record controlling means.

13. In a visual signalling system, a fixed winding having a central opening, a shaft extending through said opening, a movable winding, a supporting means connected to said shaft and secured to said movable winding whereby said movable winding is supported for movement with respect to said first winding, a stylus, a mechanical connection from said movable winding to said stylus, and means for energizing said movable winding in accordance with received picture signals for vibrating said movable winding with respect to said first winding and producing a corresponding vibration of said stylus, a second mechanical connection from said shaft to said stylus, means for rocking said shaft whereby the stylus is operated in a reciprocating motion about said shaft, and a recording chart in operating relation with said stylus.

14. In a visual signalling system, a receiver comprising a mechanical movable stylus, a recording chart in the form of an arc, means for moving said stylus across said chart in a plane normal to the recording chart, means for moving said stylus in accordance with received picture signals for producing corresponding records on said chart, and means whereby said stylus is moved over adjacent lines of said chart successively.

15. In a visual signalling system, a receiver comprising a mechanical stylus, a recording chart in the form of an arc, means for moving said stylus across said chart in a plane normal to the recording chart, means comprising a magnetic coil operable in a constant magnetic field in response to received picture signals for mechanically moving said stylus in accordance with received picture signals for producing corresponding records on said chart, and means whereby said stylus is moved over adjacent lines of said chart successively.

16. In a visual signalling system, a receiver comprising a mechanical stylus, a recording chart in the form of an arc, means for moving said stylus in a plane normal to the recording chart across said chart, means comprising a magnetic coil operable in a constant magnetic field in response to received picture signals for operating said stylus along its longitudinal direction in accordance with received picture signals for producing corresponding records on said chart, and means whereby said stylus is moved over adjacent lines of said chart successively.

17. In a visual indicator system, a transmitter, a receiver, synchronous motor means at said transmitter and receiver, positive drive connections from said motors to their respective transmitter and receiver for operating said transmitter and receiver in substantial synchronism with each other, means at said transmitter for generating picture signals in accordance with a record thereat, means at said receiver responsive to said picture signals for reproducing a record of said transmitter record, means at said transmitter for transmitting periodic synchronizing impulses, means at said receiver responsive to said synchronizing impulses for controlling the positive drive connection or release of said receiver from its synchronous motor.

18. In a visual indicator system, a transmitter, a receiver, synchronous motor means at said transmitter and receiver for operating said transmitter and receiver in substantial synchronism with each other, a positive driving connection from the synchronous motor of said receiver and its associated receiver apparatus whereby said receiver is driven positively from said synchronous motor, means at said transmitter for generating picture signals in accordance with a record thereat, means at said receiver responsive to said picture signals for reproducing a record of said transmitter record, means at said transmitter for transmitting periodic synchronizing impulses, means at said receiver responsive to said synchronizing impulses for controlling the connection or release of said receiver from said synchronous motor.

19. In a visual indicator system, a transmitter, a receiver, synchronous motor means at said transmitter and receiver; a positive drive connection from said motor means to said receiver for positive driving of said transmitter and receiver in substantial synchronism with each other, means at said transmitter for generating picture signals in accordance with a record thereat, means comprising a magnetic coil operable in a fixed magnetic field at said receiver responsive to said picture signals for reproducing a record of said transmitter record, means at said transmitter for transmitting periodic synchronizing impulses, means at said receiver responsive to said synchronizing impulses for controlling the positive drive connection or release of said receiver from said synchronous motor.

20. In a visual indicator system, a transmitter, a receiver, synchronous motor means at said transmitter and receiver; a positive drive connection from said motor means to said receiver for positive driving of said transmitter and receiver in substantial synchronism with each other, means at said transmitter for generating picture signals in accordance with a record thereat, means comprising a magentic coil operable in a fixed magnetic field, a stylus controlled by said magnetic coil at said receiver responsive to said picture signals for reproducing a record of said transmitter record, means at said transmitter for transmitting periodic synchronizing impulses, means at said receiver responsive to said synchronizing impulses for controlling the positive drive connection or release of said receiver from said synchronous motor.

21. In a visual indicator system, a transmitter, a receiver, synchronous motor means at said transmitter and receiver, a positive drive connection from said motor means to said receiver for positive driving of said transmitter and receiver in substantial synchronism with each other, means at said transmitter for generating picture signals in accordance with a record thereat, means comprising a magnetic coil operable in a fixed magnetic field, a stylus controlled by said magnetic coil in a longitudinal direction at said receiver responsive to said picture signals for reproducing a record of said transmitter record, means at said transmitter for transmitting periodic synchronizing impulses, means at said receiver responsive to said synchronizing impulses for controlling the positive drive connection or release of said receiver from said synchronous motor.

22. In a visual indicator system, a transmitter, a receiver, synchronous motor means at said transmitter and receiver, a positive drive connection from its associated motor to said receiver for operating said transmitter and receiver in substantial synchronism with each other, means at said transmitter for generating picture signals in accordance with a record thereat, means comprising a magnetic coil operable in a fixed magnetic field, a stylus controlled by said magnetic coil in a longitudinal direction and operable across a chart in straight lines at said receiver responsive to said picture signals for reproducing a record of said transmitter record, means at said transmitter for transmitting periodic synchronizing impulses, means at said receiver responsive to said synchronizing impulses for controlling the positive drive connection or release of said receiver from said synchronous motor.

23. In a visual indicator system, a transmitter, a receiver, synchronous motor means at said transmitter and receiver, a positive drive connection from its associated motor to said receiver for operating said transmitter and receiver in substantial synchronism with each other, means at said transmitter for generating picture signals in accordance with a record thereat, means comprising a magnetic coil operable in a fixed magnetic field, a stylus controlled by said magnetic coil in a longitudinal direction and operable across an arcuate chart in straight lines at said receiver responsive to said picture signals for reproducing a record of said transmitter record, means at said transmitter for transmiting periodic synchronizing impulses, means at said receiver responsive to said synchronizing impulses for the positive drive controlling the connection or release of said receiver from said synchronous motor.

24. A facsimile system having a transmitter, a receiver, a facsimile signalling channel connecting said transmitter and receiver, a motor drive for said transmitter, a motor drive for said receiver, a positive drive connections means between said receiver motor drive and said receiver, means for disconnecting said positive drive connection from between said receiver motor drive and said receiver for rendering said receiver inoperative, and means operative in the event the receiver is in synchronism with the said transmitter for preventing said disconnecting means from operating.

25. A facsimile system having a transmitter, a receiver, a facsimile signalling channel connecting said transmitter and receiver, a motor drive for said transmitter, a motor drive for said receiver, a positive drive connection means between said receiver motor drive and said receiver, means for disconnecting said positive drive connection from between said receiver motor drive and said receiver for rendering said receiver motor ineffective in driving said receiver and for simultaneously preparing to render itself nonoperative in the event that said transmitter and receiver are in synchronism.

26. In a facsimile system; a receiver comprising a pivoted arm; a rotatable motor; means including a cam driven by said motor and a follower for said cam secured to and driving said pivoted arm for translating the rotation of said motor into a reciprocating motion for rocking said arm about its pivot in a reciprocating movement for line for line scanning; and means responsive to received facsimile signals for rocking said arm in response to received impulses for making a record.

27. In a facsimile system; a receiver comprising a pivoted arm; a rotatable motor; means including a cam driven by said motor and a follower for said cam secured to and driving said pivoted arm for translating the rotation of said motor into a reciprocating motion for rocking said arm about its pivot in a reciprocating movement for line for line scanning; and means responsive to received facsimile signals for rocking said arm in response to received impulses for making a record; a positive drive connection from said motor to said cam and means responsive to synchronizing signals for controlling the connection of said positive drive.

28. A signalling system having a transmitter; a receiver; a signalling channel connecting said transmitter and receiver; a motor drive for said transmitter; a motor drive for said receiver; a positive drive connection means between said receiver motor drive and said receiver; periodic means for disconnecting said positive drive connection from between said receiver motor drive and said receiver for rendering said receiver inoperative, and means operative in the event the receiver is in synchronism with the said transmitter for preventing said disconnecting means from operating.

29. A signalling system having a transmitter; a receiver; a facsimile signalling channel connecting said transmitter and receiver; a motor drive for said transmitter; a motor drive for said receiver; a positive drive connection means between said receiver motor drive and said receiver; means at said transmitter for periodically sending out a synchronizing signal over said signalling channel and means at said receiver responsive to said synchronizing signal and rendered nonoperative thereby for disconnecting the positive connection of the motor to the receiver.

30. A facsimile system having a transmitter and a receiver; means at said transmitter for generating picture signals in accordance with a record thereat; a motor drive for said receiver; a positive drive connection means between said receiver motor drive and said receiver; means at said receiver responsive to received synchronizing signals and rendered nonoperative thereby for disconnecting the positive connection of the motor to the receiver; said receiver including means comprising a magnetic coil operable in a fixed magnetic field at said receiver responsive to said picture signals for reproducing a record of said transmitter record; a recording chart; a feed roll for said chart; a stylus operated by said motor controlled by said coil for making a record of received picture signals line by line on said chart; and means for operating said feed roll between the recording of successive lines by said stylus.

31. A facsimile system having a receiver including a recording chart; a feed roll therefor; a stylus for recording on said chart; motor means for moving said stylus across said chart in a plane normal to the recording chart; a positive drive connection between said motor and said stylus; means at said receiver responsive to received synchronizing signals and rendered nonoperative thereby for disconnecting the positive connection of the motor to the stylus; means comprising a magnetic coil operable in a constant magnetic field in response to received picture signals for mechanically moving said stylus in accordance with received picture signals for producing corresponding records on said chart; said first mentioned means operating said feed roll for each operation of said stylus whereby said stylus is moved from line to line on said recording sheet.

32. In a visual signalling system; a receiver including a mechanical stylus; a recording chart; a feed roll therefor; motor means for reciprocating said stylus across said chart; a positive drive connection between said motor and stylus; means at said receiver responsive to received synchronizing signals and rendered nonoperative thereby for disconnecting the positive connection of the motor to the stylus; means comprising a magnetic coil operable in a constant magnetic field in response to received picture signals for operating said stylus along its longitudinal direction in accordance with received picture signals for producing corresponding records on said chart; said first means also operating said feed roll whereby said stylus is moved over adjacent lines of said chart successively.

33. In a visual indicator system; a transmitter; a receiver; synchronous motor means at said transmitter and receiver; positive drive connections from said motors to their respective transmitter and receiver for operating said transmitter and receiver in substantial synchronism with each other; means at said transmitter for generating picture signals in accordance with a record thereat; means at said receiver responsive to said picture signals for reproducing a record of said transmitter record; means at said transmitter for transmitting periodic synchronizing impulses; means at said receiver responsive to said synchronizing impulses for controlling the positive drive connection or release of said receiver from its synchronous motor; a record chart at said receiver; a feed roll therefor; means for periodically operating said feed roll for presenting new lines on said chart for recording.

34. A signalling system having a transmitter; a receiver; a signalling channel connecting said transmitter and receiver; continuous synchronous positive driving means at said transmitter and receiver; a positive drive connecting means between said receiver driving means and said receiver; means for periodically disconnecting said drive connecting means from between said receiver driving means and said receiver for rendering said driving means at said receiver nonefective; and means operative in the event the receiver is in synchronism with said transmitter for preventing said disconnecting means from operating.

35. In a signalling system; a transmitter; a receiver; a signalling circuit connecting said transmitter and receiver; a positive drive for said receiver; synchronizing apparatus at said receiver; switching means at said receiver for periodically switching said receiving and synchronizing apparatus to said signalling circuit; and means operative at the time when said synchronizing apparatus is connected to said signalling circuit to disconnect said receiver from the drive therefor until a synchronizing impulse is received.

36. In a signalling system; a transmitter; a receiver; a signalling circuit connecting said transmitter and receiver; a positive drive for said receiver; synchronizing apparatus at said receiver; switching means at said receiver for periodically switching said receiver and synchronizing apparatus to said signalling circuit; means operative at the time when said synchronizing apparatus is connected to said signalling circuit to disconnect said receiver from the drive therefor until a synchronizing impulse is received; means for operating said receiver in response to received signals; a record sheet; a feed roll therefor; and means for periodically operating said feed roll from said receiver for successively presenting new lines to said receiver.

37. A signalling system having a transmitter; a receiver; a signalling channel connecting said transmitter and receiver; a motor drive for said transmitter; a motor drive for said receiver; a positive drive connection means between said receiver motor drive and said receiver comprising a ratchet wheel secured to and driven by said motor; a pawl engaging said ratchet wheel secured to and driving said receiver; a magnet having an armature; means comprising a cammed pawl mounted on said armature for disconnecting said positive drive connection from between said receiver motor drive and said receiver for rendering said receiver nonoperative; and means including said magnet operative in the event the receiver is in synchronism with the said transmitter for preventing said disconnecting means from operating.

38. A signalling system having a transmitter; a receiver; a signalling channel connecting said transmitter and receiver; a motor drive for said transmitter; a motor drive for said receiver; a positive drive connection means between said receiver motor drive and said receiver comprising a ratchet wheel secured to and driven by said motor; a pawl engaging said ratchet and secured to and driving said receiver; a magnet having an armature; means comprising a cammed pawl mounted on said armature for disconnecting said positive drive connection from between said receiver motor drive and said receiver for rendering said receiver motor non-effective for driving said receiver; and a switch for simultaneously preparing to render said receiver non-operative in the event that said transmitter and receiver are in synchronism.

39. A signalling system having a transmitter; a receiver; a signalling channel connecting said transmitter and receiver; a motor drive for said transmitter; a motor drive for said receiver; a positive drive connection means between said receiver motor drive and said receiver comprising a ratchet wheel secured to and driven by said motor; a disk mounted on said receiver and a pawl engaging said ratchet wheel and secured to said disk; a magnet having an armature; means comprising a cammed pawl mounted on said armature for disconnecting said positive drive connection from between said receiver motor drive and said receiver for rendering said receiver motor noneffective for driving said receiver; and a cam on said disk; a switch controlled by said disk for rendering said magnet operative or inoperative to respond to received signals for simultaneously preparing to render said receiver non-operative in the event that said transmitter and receiver are in synchronism.

40. A signalling system having a transmitter; a receiver; a signalling channel connecting said transmitter and receiver; a motor drive for said transmitter; a motor drive for said receiver; a positive drive connection means between said receiver motor drive and said receiver comprising a ratchet wheel secured to and driven by said motor; a disk mounted on said receiver and a pawl engaging said ratchet wheel and secured to said disk; a magnet having an armature; means comprising a cammed pawl mounted on said armature for disconnecting said positive drive connection from between said receiver motor drive and said receiver for rendering said receiver motor ineffective in driving said receiver; a cam on said disk; a switch controlled by said disk for rendering said magnet operative or non-operative to respond to received signals for simultaneously preparing to render said receiver non-operative in the event that said transmitter and receiver are in synchronism; said cam on said disk being arranged to operate said switch to disconnect the magnet at the instant a synchronizing impulse is being received in the event the receiver is in synchronism with the transmitter.

41. In a facsimile receiver, a scanner, a source of power, a positive drive from said source of power to said scanner, a synchronizing magnet and means controlled by said magnet for disconnecting the positive drive by said source of power in the event the receiver is not in synchronism with the received signals.

42. In a facsimile receiver, a scanner, a source of power, a cam, a pawl and ratchet connection from said source of power to said cam, a cam follower, means controlled by said cam follower for oscillating said scanner, means for periodically receiving a synchronizing signal and means responsive to said signal for disengaging said pawl from said ratchet and thereby disconnecting said source of power from said cam.

43. In a facsimile receiver; a picture signal responsive magnet; a scanner operated by said magnet in accordance with received picture signals; a source of power; a positive drive from said source of power to said scanner; a synchronizing magnet and means controlled by said magnet for disconnecting the positive drive from said source of power in the event the scanner is not in synchronism with the received signals.

44. In a facsimile receiver; a picture signal responsive magnet; a scanner operated by said magnet in accordance with received picture signals; a source of power; a positive drive from said source of power to said scanner; a synchronizing magnet; an electrical circuit for said magnet; a switch for connecting said circuit to receive picture signals, said switch operating periodically to connect said synchronizing magnet to receive a synchronizing signal; means controlled by said magnet for disconnecting said source of power from said drive in the event the scanner is not in synchronism with the received signals.

45. In a facsimile receiver, a picture signal responsive magnet; a scanner operated by said magnet in accordance with received picture signals; a source of power; a positive drive from said source of power to said scanner; an electrical circuit for said magnet; a switch for connecting said circuit to receive picture signals; a synchronizing magnet, said switch operating periodically to connect said synchronizing magnet to receive a synchronizing signal and means controlled by said synchronizing magnet in response to received synchronizing signals for periodically disconnecting said positive drive from said source of power to said scanner.

46. In a facsimile receiver; a picture signal responsive magnet; a scanner operated by said magnet in accordance with received picture signals; a source of power; a positive drive from said source of power to said scanner; a recording sheet in operative relation with said scanner; a feeder for said sheet; a synchronizing magnet responsive to periodic synchronizing impulses; and means controlled periodically by said synchronizing magnet in response to received synchronizing impulses for disconnecting said positive drive from said source of power to said scanner.

47. In a facsimile receiver; a picture signal responsive magnet; a scanner operated by said magnet in accordance with received picture signals; a source of power; a positive drive from said source of power to said scanner; a recording sheet in operative relation with said scanner; a feeder for said sheet; a cam; said positive drive comprising a pawl and ratchet connection from said source of power to said cam; a reciprocating arm for operating said feeder; and a member driven by said source of power when said pawl engages said ratchet for reciprocating said arm once for each scanning cycle to feed said sheet to successive lines, a synchronizing magnet periodically operated in response to synchronizing impulses; and means responsive to said synchronizing magnet for periodically disconnecting said positive drive from said source of power to said cam through said pawl and ratchet.

WILLIAM G. H. FINCH.

DISCLAIMER

Re. 19,575.—*William G. H. Finch*, Washington, D. C. IMAGE BROADCASTING SYSTEM. Patent dated May 21, 1935. Disclaimer filed March 10, 1936, by the patentee.

Hereby enters this disclaimer to that part of claim 41 in said specification which is in the following words, to wit:
"a source of power" (lines 1 and 2) and "disconnecting the positive drive by said source of power" except where these phrases are interpreted to read: "a source of motive power" and "disconnecting the positive drive from said source of motive power" respectively.

[*Official Gazette April 21, 1936.*]